United States Patent
Koppelaar

(10) Patent No.: US 7,680,230 B2
(45) Date of Patent: Mar. 16, 2010

(54) FRAME FORMAT DECODER AND TRAINING SEQUENCE GENERATOR FOR WIRELESS LAN NETWORKS

(75) Inventor: Arie Geert Cornelis Koppelaar, Eindhoven (NL)

(73) Assignee: NXP B.V., Eindhoven (NL)

( * ) Notice: Subject to any disclaimer, the term of this patent is extended or adjusted under 35 U.S.C. 154(b) by 841 days.

(21) Appl. No.: 10/561,856

(22) PCT Filed: Jun. 21, 2004

(86) PCT No.: PCT/IB2004/050941

§ 371 (c)(1),
(2), (4) Date: Dec. 21, 2005

(87) PCT Pub. No.: WO2004/114596

PCT Pub. Date: Dec. 29, 2004

(65) Prior Publication Data

US 2007/0140296 A1    Jun. 21, 2007

(30) Foreign Application Priority Data

Jun. 25, 2003  (EP)  ............................. 03101875

(51) Int. Cl.
H04L 7/00  (2006.01)
(52) U.S. Cl. ........................................ 375/368; 375/364

(58) Field of Classification Search .................. 375/130, 375/132, 145, 149, 316, 354, 359, 365, 364, 375/368; 370/349, 342, 338, 329
See application file for complete search history.

(56) References Cited

U.S. PATENT DOCUMENTS

| | | | | |
|---|---|---|---|---|
| 5,504,454 A * | 4/1996 | Daggett et al. | ............... | 329/304 |
| 5,608,734 A * | 3/1997 | Sandler et al. | ............... | 370/509 |
| 5,666,366 A * | 9/1997 | Malek et al. | ................. | 370/505 |
| 6,614,864 B1 * | 9/2003 | Raphaeli et al. | ............. | 375/371 |
| 6,967,994 B2 * | 11/2005 | Boer et al. | ................... | 375/219 |
| 7,403,539 B1 * | 7/2008 | Tang et al. | .................. | 370/445 |
| 2003/0147374 A1* | 8/2003 | Chiu et al. | ................... | 370/349 |
| 2003/0161355 A1* | 8/2003 | Falcomato et al. | .......... | 370/539 |

* cited by examiner

Primary Examiner—Jean B Corrielus

(57) ABSTRACT

A frame format decoder (22) and training sequence generator (24) for determining the frame format of received data which is compliant with the IEEE 802.1 1b standard for wireless local area networks, and for providing a training sequence for an adaptive equalizer (16). The received signal is first despreaded, demodulated and descrambled, so that the SYNC field is reconstructed, and then a counter 32 counts the number of consecutive bits having the same polarity or logic value until N such bits are counted (where N is an integer greater than 1). The polarity or logic value of the N counted bits enables the decoder (22) to determine whether the frame format is long or short. A training sequence, being a copy of the transmitted SYNC field eventually followed by an SFD field, is also generated for use by an adaptive equalizer (16).

19 Claims, 5 Drawing Sheets

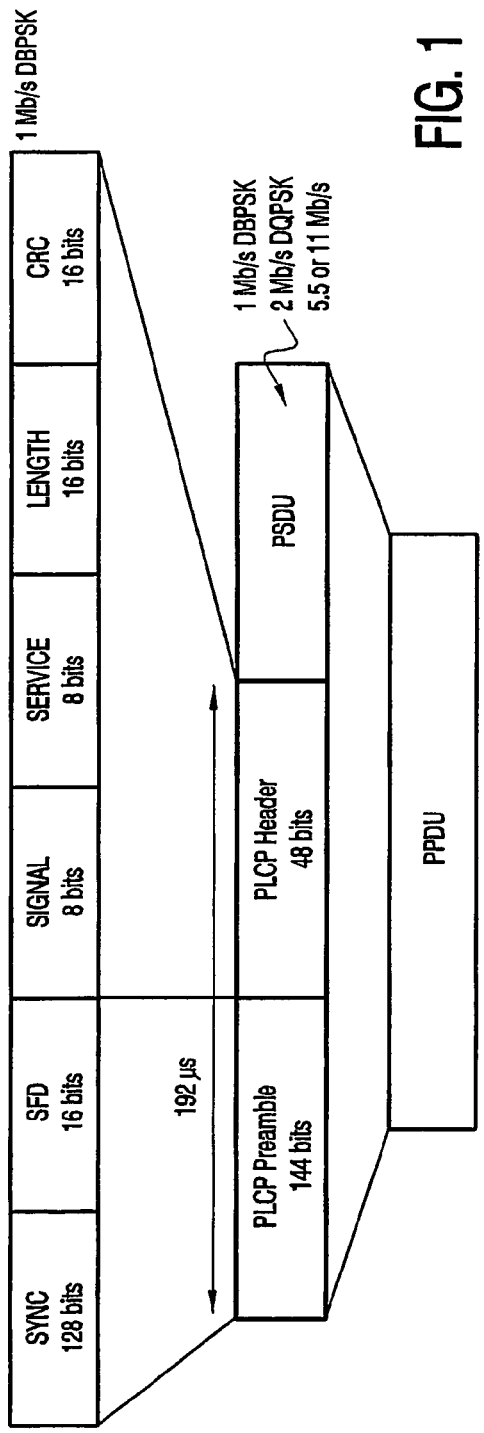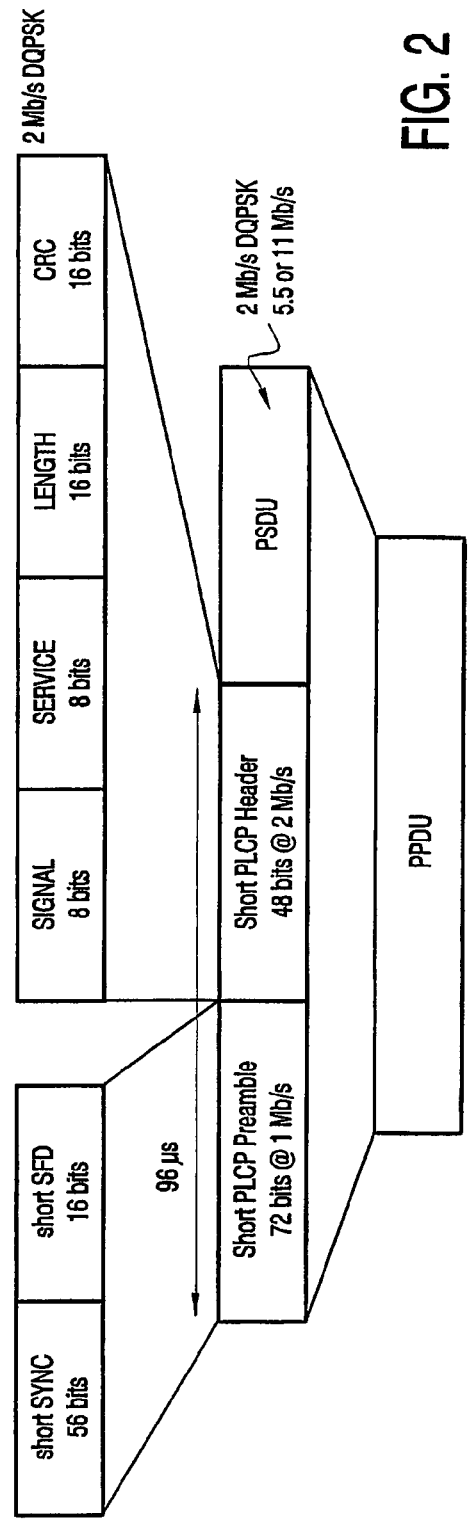
FIG. 1
FIG. 2

FRAME FORMAT DECODER AND TRAINING SEQUENCE GENERATOR FOR WIRELESS LAN NETWORKS

This invention relates generally to spread spectrum code position modulation communications and, more particularly, to a method and apparatus for decoding a spread spectrum code position modulated signal transmitted over a dispersive transmission medium and a receiver employing the same.

The concept of wireless communication in, for example, computer systems configured as local area networks (LANs) has been well known for many years, but interest therein was limited until the release of the 2.4 GHz unlicensed band for industrial, scientific and medical (ISM) applications.

Wireless LAN products most often employ either direct sequence spread spectrum (DSSS) or frequency hopping spread spectrum (FHSS) techniques to communicate between roaming mobile stations and network access points. A distinguishing feature of the spread spectrum technique is that the modulated output signals occupy a much greater transmission bandwidth than the baseband information bandwidth required. The spreading is achieved by encoding each data bit in the baseband information using a codeword or symbol that has a much higher frequency than the baseband information bit rate. The resultant. "spreading" of the signal across a wider frequency bandwidth results in comparatively lower power spectral density, so that other communication systems are less likely to suffer interference from the device that transmits the spread spectrum signal. It also makes the spread signal harder to detect and less susceptible to interference (i.e. harder to jam).

Both DSSS and FHSS techniques employ a pseudo-random (PN) codeword known to the transmitter and to the receiver, to spread the data and make it more difficult to detect by receivers lacking the codeword. The codeword consists of a sequence of "chips" having values of −1 and +1 (polar) or 0 and 1 (non-polar) that are multiplied by (or XORd with) the information bits to be transmitted. Accordingly, a logic '0' information bit may be encoded as a first predetermined codeword and a logic '1' information bit may be encoded as a second predetermined codeword sequence.

Many wireless networks conform to the IEEE 802.11 standard, which employs the well-known Barker code to encode and spread the data. The Barker codeword consists of eleven chips having the sequence '00011101101' or '+++−−−+−−+−'. One entire Barker codeword sequence, or symbol, is transmitted in the time period occupied by a single binary information bit. Thus, if the symbol (or Barker sequence) rate is 1 MHz, the underlying chip rate for the eleven chips in the sequence is 11 MHz. By using the 11 MHz chip rate signal to modulate the carrier wave, the spectrum occupied by the transmitted signal is eleven times greater. Accordingly, the recovered signal in the receiver, after demodulation and correlation, comprises a series of inverted Barker sequences representing for example logic '1' information bits, and non-inverted Barker sequences representing for example logic '0' information bits.

The IEEE 802.11b standard uses 64 CCK (Complementary Code Keying) chipping sequences to achieve 11 Mbps. Rather than using the Barker code, CCK uses a series of codes called Complementary Sequences. Because there are 64 unique codewords that can be used to encode the signal, up to 6 bits can be represented by any one particular codeword (instead of the one bit represented by a Barker symbol).

EP-A-0851603 describes a system for, and method of, generating a spread spectrum code position modulated waveform for use in data transmission in a wireless Local Area Network (LAN), in which a transmitter is provided which transmits each of a plurality of data sequences at time intervals which differ from the sequence length, thereby enabling the data rate to be increased without increasing the bandwidth of the resulting spread spectrum code position modulated waveform.

Reception in a multi-path environment can be substantially improved by equalization. The typical environment for wireless LANs is the office or home. There, the multi-path delay spread is of the order of 100 ns or less. Usually the presence of walls in the direct path makes the system work from indirect paths, and that makes the impulse response have energy leading the peak of the energy. This is called precursor energy, and requires more complex processing than does the trailing energy from delayed echoes. Typically, precursor processing involves complex multiply operations, whereas trailing energy involves add and subtract operations.

Large warehouses and factories often have much larger delay spreads and this takes more equalization processing. There exists a range of known processing principles that can be employed in the receiver processing module to meet the requirements of each of these environments.

The RAKE receiver principle is good for modest multi-path of around 100 ns delay spread. The classical RAKE receiver has multiple correlators with a delay and a combine circuit following the correlators. For the CCK waveform, this would result in a complex design, as the CCK scheme requires multiple correlators for each of the multiple correlators of the RAKE technique. By linear transformation, the RAKE combiner can be moved to the input of the correlator bank, where it is much simpler. In this form, it is called a Channel Matched Filter, because it complements the channel impulse response and therefore corrects for it This removes the channel effects as far as can be done with a fixed filter, but does not correct for inter-symbol or inter-chip interference (ISI/ICI). The RAKE-only receiver can achieve near 100 ns delay spread performance without an equalizer.

For the larger delay spreads, an ISI/ICI equalizer is needed and this increases the complexity in several ways. First, the equalizer requires a lot of gates running very fast in the receiver, and second it requires a Decision Feedback Equalizer (DFE) to properly handle the ISI and ICI.

The first stage of equalization is ISI cancellation and that involves taking the output of the symbol decisions and then subtracting the left over energy of the previous symbol from the current symbol before demodulation.

The next stage in equalization is canceling the ICI interference and that requires a more complex process since the ICI depends on which of the 64 vectors is received.

Data to be transmitted is encapsulated or "packed" into frames at the transmitter, and decapsulated or "unpacked" from the frames at the receiver. The packet preamble provides a mechanism for establishing synchronization (SYNC) between the packing and unpacking operations. The IEEE 802.11b standard for Wireless Local Area Networks describes two physical frame formats, namely the long frame format illustrated in FIG. 1 of the drawings and the optional short frame format illustrated in FIG. 2.

The SYNC field in the long frame format consists of 128 bits. These 128 bits comprise an all-one sequence, scrambled with a data scrambler (illustrated in FIG. 3) that uses the initial seed 1101100 (leftmost bit in the first memory element and rightmost bit in the last memory element). The Start Field Delimiter (SFD) indicates the start of PHY (Physical Layer)-dependent parameters and is equal to 1111001110100000 (Hexadecimal F3A0), wherein the rightmost bit is transmitted first. The SYNC field and the SFD together form the PLCP (Physical Layer Convergence Protocol) preamble. The SIGNAL field consists of 8 bits and indicates to the PHY the modulation that shall be used for transmission of the PSDU (PLCP Service Data Unit).

The SYNC field in the short frame format consists of 56 bits, comprising 56 zero bits scrambled with a data scrambler (as illustrated in FIG. 3 of the drawings). However, the scrambler in this case uses a different initial seed: 0011011. The SFD is again a 16-bit field, but in comparison to the SFD field in the long frame format, the bits are reversed in time (Hexadecimal 05CF).

The short frame format may be used to minimize overhead and, therefore, maximize the network data throughput However, a transmitter using the short frame format can only interoperate with another receiver which is also capable of receiving the short frame format In order to interoperate with a receiver that is not capable of receiving the short frame format, the transmitter must use the long frame format.

Thus, in the case of a receiver which is capable of receiving both the long and the short frame formats, during reception of the SYNC field, a receiver must determine whether the short or long frame format is used by the transmitter, such that equalizers, demodulators and decoders can be appropriately configured by the receiver controller. Moreover, for training of an adaptive equalizer, it is necessary to generate a (chip-) aligned training sequence, and the length and content of such a training sequence depends on the frame format being used.

We have now devised an arrangement which addresses the above-mentioned issues.

In accordance with the present invention, there is provided apparatus for determining a frame format of data received by a receiver, said frame format including a synchronization field which defines said frame format as being of a first or second type, the apparatus comprises a counter arranged to count a number of consecutive bits of the synchronization field of a received frame and determining, when N consecutive bits having the same polarity or logic value have been counted, if said frame format is of said first or second type, depending on the polarity or logic value of said N consecutive bits, where N is an integer greater than 1.

In a preferred embodiment of the invention, the first frame format comprises a short frame format with a synchronization field having a first predetermined number of bits, and the second frame format comprises a long frame format with a synchronization field having a second predetermined number of bits, the second predetermined number being greater than the first predetermined number. Preferably, the short frame format has a synchronization field comprising a first predetermined number of consecutive bits of a first polarity or logic value, and the second frame format has a synchronization field comprising a second predetermined number of consecutive bits of a second polarity or logic value, opposite to the first polarity or logic value. In fact, in a more preferred embodiment of the invention, the first and second frame formats comply with the IEEE 802.11b standard for wireless local area networks.

Beneficially, the synchronization field is scrambled prior to transmission thereof, and the apparatus comprises a corresponding descrambling means to which the received data frame is applied, the output of the descrambling means being applied to the counting means.

The data frame may be spread by means of a direct sequence spread spectrum or frequency hopping spread spectrum technique prior to transmission thereof, and the apparatus may comprise a corresponding despreader to which the received data frame is applied prior to the data being passed to the counting means. Demodulating means may be provided for demodulating the output data from the despreader, prior to the data being provided to the counting means. Beneficially, the demodulating means comprises a differential binary phase shift keying demodulator.

Preferably, data representative of the frame format type is output in the form of a training sequence for an equalizer. In fact, data representative of the frame format type and the training sequence are preferably output substantially simultaneously. Data output from the descrambling means mentioned above may be applied to scrambling means, modulating means and data spreading means, prior to being output as the training sequence.

The present invention extends to a decoder for use in a receiver, the decoder including apparatus as defined above.

The invention further extends to a receiver including a decoder as defined above. The wireless receiver preferably includes an equalizer, which is more preferably an adaptive equalizer. Thus, in a preferred embodiment of the invention, the above-mentioned training sequence is provided to the adaptive equalizer.

The invention extends further to a wireless local area network comprising at least one transmitter for transmitting frames of data, and at least one receiver as defined above for receiving the frames of data.

Also in accordance with the present invention, there is provided a method of determining a frame format of data received by a receiver, the frame format including a synchronization field which defines the frame format being a first or second type, the method comprising the steps of counting a number of consecutive bits of the synchronization field of a received frame and determining, when N consecutive bits having the same polarity or logic value have been counted, if the frame format is of the first or second type, depending on the polarity or logic value of the N consecutive bits, where N is an integer greater than 1.

Preferably, the method includes the step of outputting data representative of the frame format type in the form of a training sequence for an equalizer, wherein data representative of the frame format type and the training sequence are output substantially simultaneously.

The used transmitter and receiver according to the invention could also be a wireless transmitter and a wireless receiver.

These and other aspects of the present invention will be apparent from, and elucidated with reference to, the following description of an exemplary embodiment of the invention.

An embodiment of the present invention will now be described by way of example only and with reference to the accompanying drawings, in which:

FIG. 1 illustrates a long frame format used in the IEEE 802.11b standard;

FIG. 2 illustrates a short frame format used in the IEEE 802.11b standard;

Figure 5:
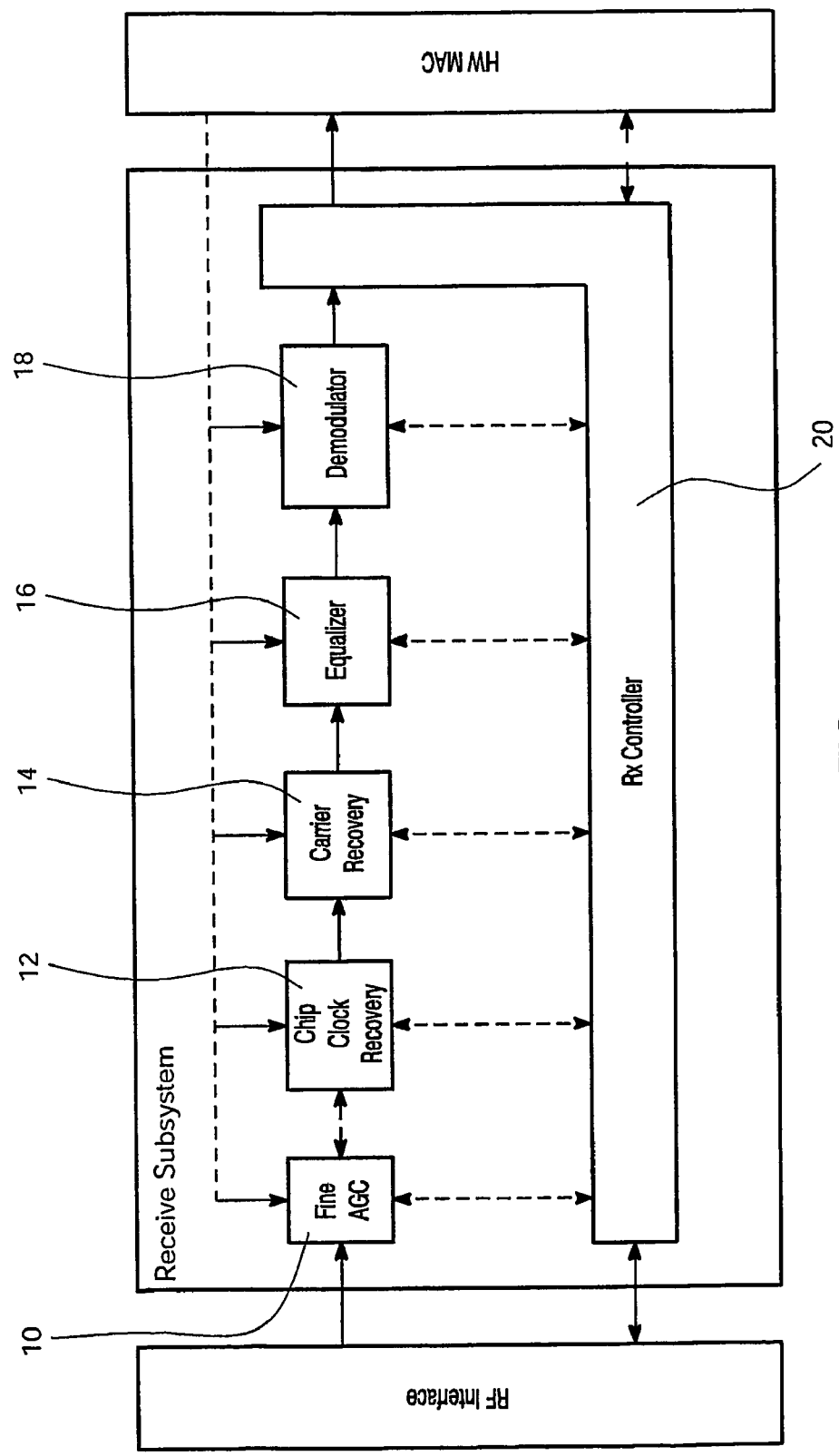
FIG. 5 is a schematic high level block diagram of a receiver according to an exemplary embodiment of the present invention.

Referring to FIG. 5 of the drawings, a receiver subsystem according to an exemplary embodiment of the present invention comprises a Fine AGC module 10, a chip clock recovery module 12, a carrier recovery module 14, an equalizer 16, a demodulator 18, and a receiver (Rx) controller 20.

The fine AGC module 10 performs four functions:

1. additional adjustment of the received signal power for optimal receiver performance;

2. mapping of the 8 bits from the RF interface to the 6 effective bits required by the Rx blocks;

3. avoidance of clipping of the data after gain correction; and 4. providing a preliminary gain adjustment early in the power measurement and correction process, so as to prevent large variations in signal power during the acquisition phase.

The chip clock recovery module 12 measures the sampling phase and tracks it. The output of this module comprises the I/Q signals, oversampled at 22 MHz. This module ensures that, in spite of any sample clock inaccuracies, the sampling phase will be kept constant. The T/2 spaced equalizer 16 therefore derives the optimum sampling phase.

The carrier recovery loop 14 corrects for any carrier frequency error which may exist. During the PREAMBLE part, the carrier recovery module 14 uses a Barker despreader and an initial frequency estimator to initialize the loop. After the initialization, the loop uses a slicer on the output of the Barker despreader (DSSS mode) or the equalizer 16 (CCK mode) to continuously track and correct the phase error. The output of the Barker despreader is during the PREAMBLE part analyzed with a peak detector in order to achieve symbol synchronization.

The Equalizer 16 is a T/2 spaced equalizer with a Feed-Forward part and a Decision Feedback part. The equalizer is trained on the PLCP preamble and uses decision-directed adaptation to update its coefficients during the DATA part. The output of the equalizer 16 comprises the I/Q signals from which the echoes have been removed. During the PREAMBLE part, the apparatus differentially decodes (non-coherent) and descrambles the output of the Barker despreader which is in the carrier recovery module 14, to generate a reference training sequence. It will then tell the Rx controller 20 whether this a short frame or long frame format preamble. Using this reference, the equalizer 16 is trained.

The demodulator 18 correlates the output of the equalizer 16 with the Barker sequence and uses a peak extractor to determine the peaks of the correlator output. The output of this Barker despreader is only valid on these peaks (i.e. once every 11 chips). During the PREAMBLE part, the demodulator 18 is not operational. During the DATA part, the operation of the demodulator 18 depends on the transmission rate. In case of a transmission rate of 1 or 2 Mbps, the demodulator 18 will (coherently) differentially decode the output of the Barker despreader. In case of a transmission rate of 5.5 or 11 Mbps, the CCK decoder is used to translate the output of the equalizer 16 into data bits. In both cases, a descrambler is required to remove the Pseudo Random Sequence from the data.

Figure 6:
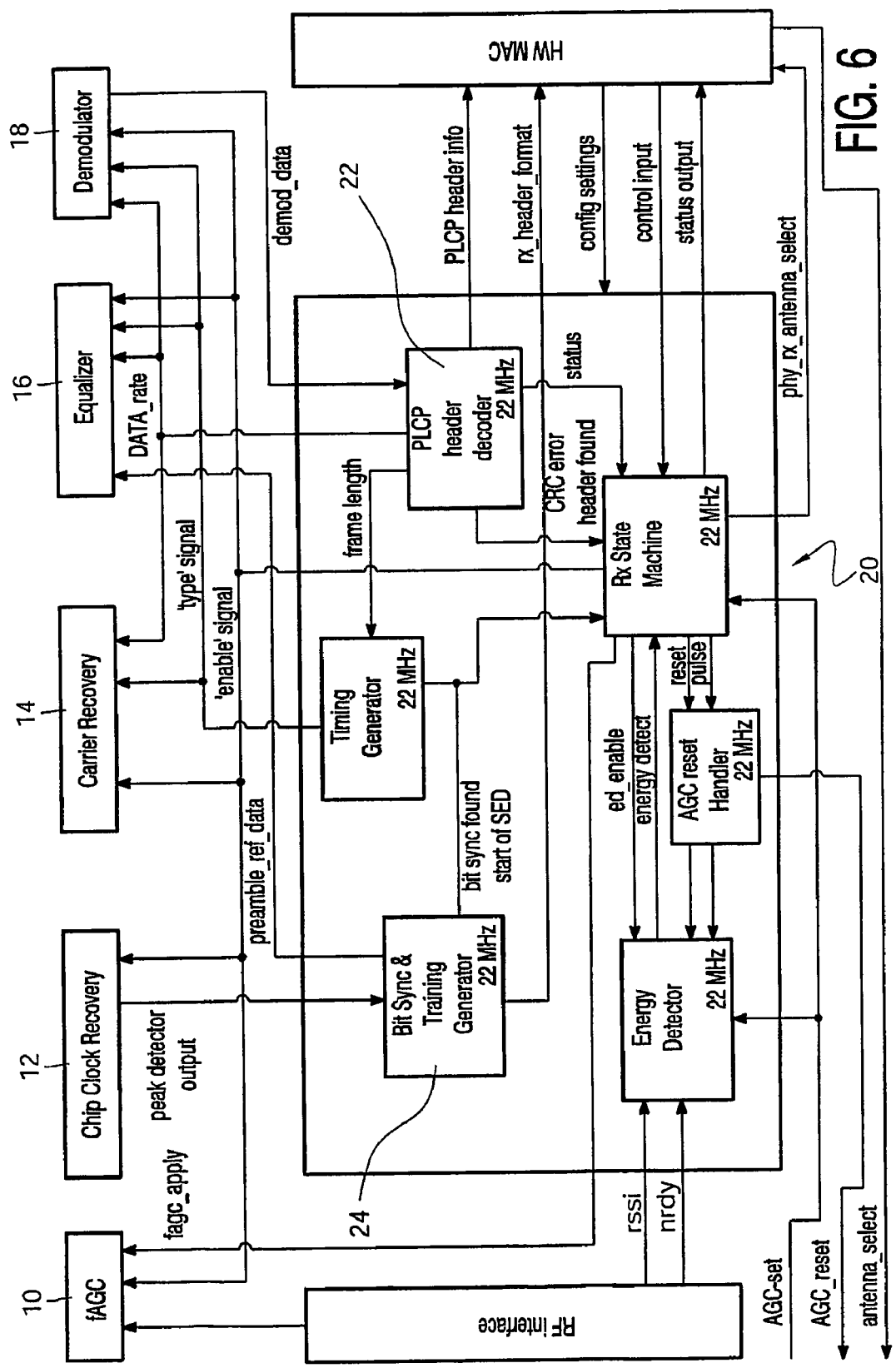
FIG. 6 is a schematic block diagram of a receiver controller for use with the receiver of FIG. 5.

The Rx controller 20, among other functions, contains the state machine that switches the modes of the receiver blocks and controls the datapath of the receiver. Referring to FIG. 6 of the drawings, when the HW MAC enables the CCA mode or the Rx mode, the Rx controller 20 will start to monitor the channel to determine if a frame can be detected. If energy appears on the medium, the Rx controller starts the chip clock recovery 12 and Barker despreader (in the carrier recovery module 14) to further investigate the signal. If a Barker sequence can also be found, the rest of the receiver is enabled and the controller 20 attempts to demodulate and decode the frame (PLCP header decoder 22). The Rx controller 20 monitors the preamble data to determine the end of the preamble and hence the start of the data part of the frame. The antenna diversity algorithm also resides in the Rx controller 20.

Figure 3:
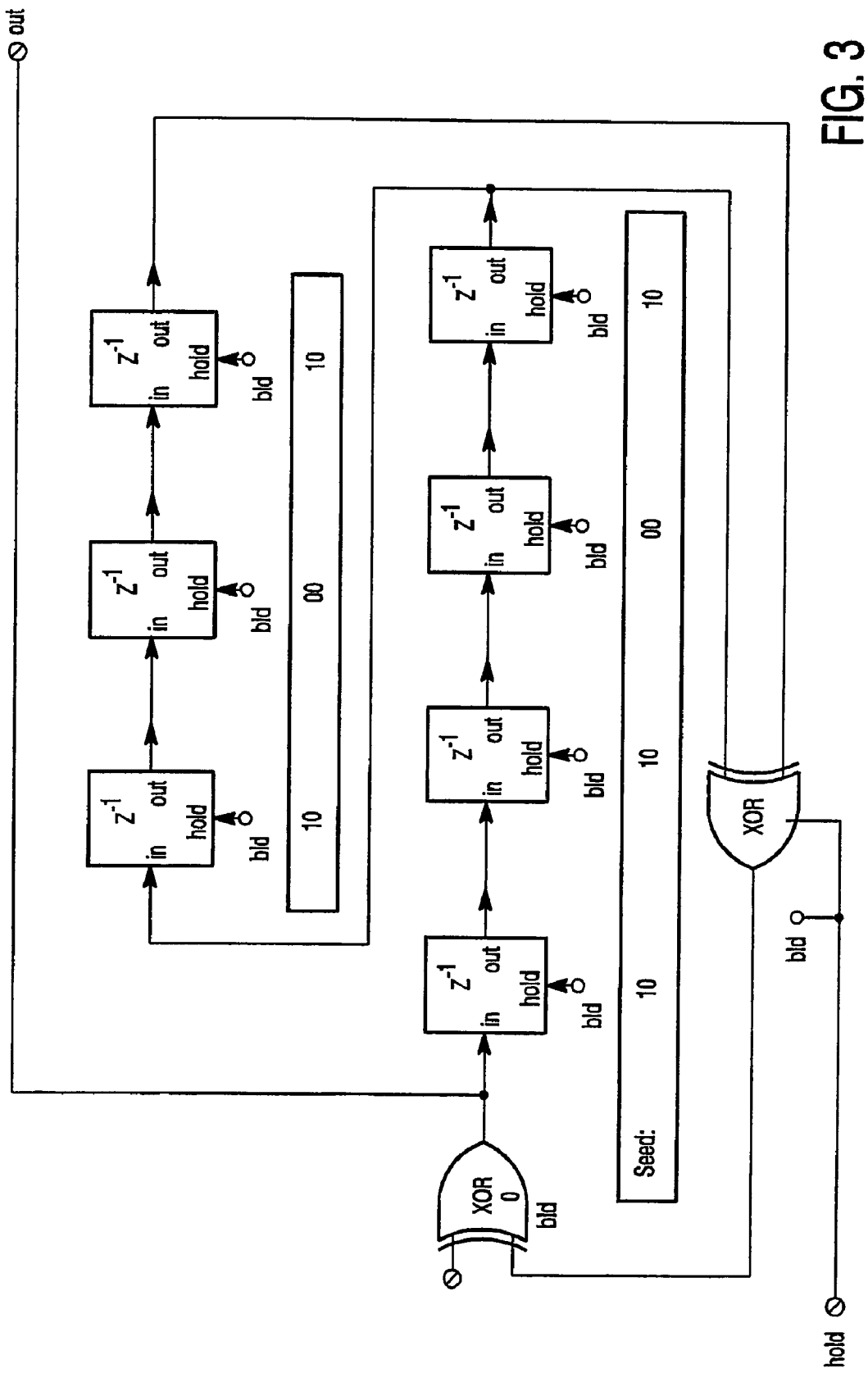
FIG. 3 is a schematic block diagram of a data scrambler.
Figure 4:
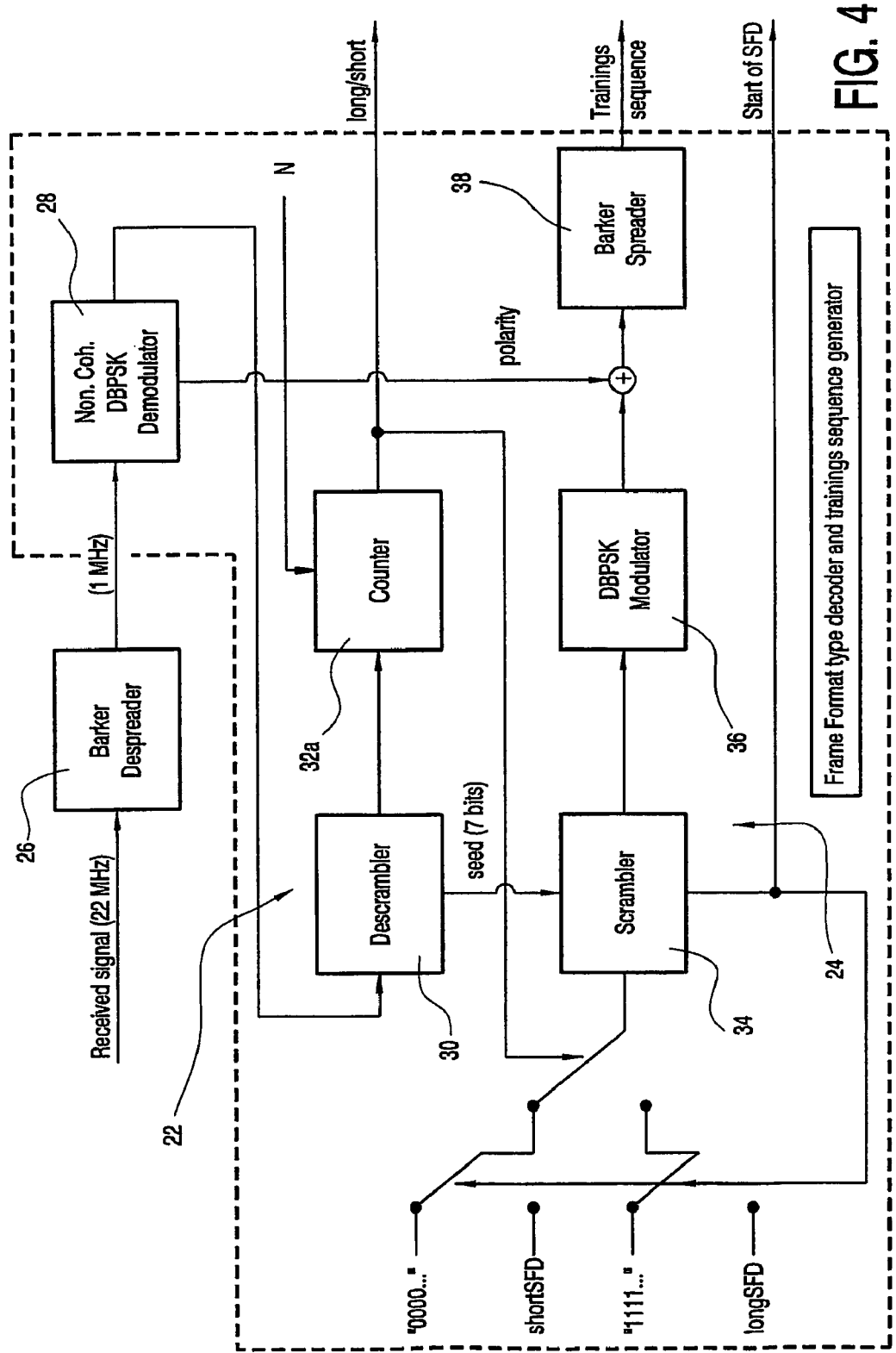
FIG. 4 is a schematic block diagram of a frame format decoder and training sequence generator according to an exemplary embodiment of the present invention.

Referring to FIG. 4 of the drawings, a frame format decoder 22 and training sequence generator 24 according to an exemplary embodiment of the present invention is illustrated. The received signal is despreaded with a Barker despreader 26 (both the PLCP preamble and PLCP header are spreaded with an 11-chip Barker sequence). A peak extractor (not shown in FIG. 4) identifies the symbol (bit) boundaries and generates a bit clock that will be used by the decoder 22. The despreaded symbols are demodulated by a non-coherent Differential Binary Phase Shift Keying (DBPSK) demodulator 28 (in the case that a DBPSK modulator is used in the transmitter). A non-coherent DBPSK demodulator is used because at the start of the frame, the frequency/phase loop will not have settled completely. Waiting until this loop has settled can cost additional time, which is undesirable because it is required to train the equalizer as soon as possible.

The output of the DBPSK demodulator 28 is passed to a descrambler 30. The descrambler 30 is self-synchronizing so that initialization of the descrambler 30 is not required.

In the case of error-free reception, the output of the descrambler 30 will consist of zeros (short frame format) or ones (long frame format) during the SYNC field. By means of a counter 32, the number of consecutive zeros or ones is counted. When N consecutive zeros or ones are counted, the decoder 22 assumes that the frame format is of the short or long frame type respectively. N is an integer, and is a design parameter. For small N, the probability of a wrong decision is relatively great, whereas if N is large, the probability of a wrong decision is relatively small but it takes more time to make the decision.

In this exemplary embodiment, N is 7 because with 7 consecutive bits with same polarity it is almost certain that the shift register content (also 7 bits) of the descrambler is error free. Taking less than 7, increases the probability of a wrong frame formed detection, and moreover, one does not know for sure whether the shift register content is error free. Taking more than 7, one decreases the probability of a wrong frame format detection but due to delayed detection, less time can be spent on training the equalizer such that frame errors can occur due to insufficient training. Thus, in this exemplary embodiment, 7 is a good number for N, and $\geqq$ is a good range.

A scrambler 34 is provided, and both the descrambler 30 and scrambler 34 consist of 7-bit shift bit registers. The content of these shift registers is therefore unique for each of the 128 (long frame format, except the first and last bit) or 56 (short frame format) bits in the SYNC field. When a decision is made (long or short frame format), the content of the shift register of the descrambler 30 is assumed to be error-free and therefore copied to the shift register of the scrambler 34. In this way, the scrambler 34 that is used for producing the training sequence is initialized correctly and, by feeding bits of the correct polarity (zeros in the case of short frame format and ones in the case of long frame format) to the scrambler 34, the output of the scrambler 34 will produce the correct scrambled sequence.

The output of the scrambler 34 is provided to another DBPSK modulator 36. Since at the output of the modulator 36 there is an ambiguity of B radians, the polarity of the output sequence is corrected by adding the polarity of one specific bit in the non-coherent demodulator 28. Finally, the sequence is spreaded with an 11-chip Barker spreader 38, so as to obtain a chip-based training sequence which can be used by an adaptive equalizer.

In order to align the training sequence with the received sequence, it is necessary to compensate for latencies in the decoder 22 and for latencies in the datapath of the equalizer 16. Since the shift register content of the scrambler 34 is more or less unique, it is possible to extrapolate the shift register content of the descrambler 30 one or more steps forward or back in time.

Another feature of the uniqueness of the shift register content can be used for detection of the start of the SFD field. In this way, the training sequence can be extended by also applying the 16 bits of the SFD field to the scrambler 34.

Thus, the present invention provides a method and apparatus by means of which the frame format of the frame format can be determined automatically, and a training sequence for an adaptive equalizer can be generated at substantially the same time. Further, no explicit SYNC field bit position detection is required, so the decoder is not confined to finding a specific sequence in the SYNC field; and, as mentioned above, means for detecting the start of the SFD field can be easily incorporated.

An embodiment of the present invention has been described above by way of example only, and it will be apparent to a person skilled in the art that modifications and variations can be made to the described embodiment without departing from the scope of the invention as defined by the appended claims. It will also be understood that the term "comprising" used herein does not exclude additional elements, "a" or "an" does not exclude a plurality, and a single processor or other unit may be used to fulfill the functions of several means recited in the claims.

The invention claimed is:

1. An apparatus for determining a frame format of data, said frame format including a synchronization field which defines said frame format as being of a first or second type, the apparatus comprising:
   a frame format decoder comprising a counter configured to count a number of consecutive bits of the synchronization field of a frame, wherein the frame format decoder is configured to determine, when N consecutive bits having the same polarity or logic value have been counted by said counter, if said frame format is of said first or second type, depending on the polarity or logic value of said N consecutive bits, where N is an integer greater than 1; and
   a training sequence generator configured to output data representative of said frame format type in the form of a training sequence for an equalizer.

2. The apparatus according to claim 1, wherein said first frame format comprises a short frame format with a synchronization field having a first predetermined number of bits, and said second frame format comprises a long frame format with a synchronization field having a second predetermined number of bits, said second predetermined number being greater than said first predetermined number.

3. The apparatus according to claim 1, wherein said first frame format comprises a short frame format with a synchronization field having a first predetermined number of consecutive bits of a first polarity or logic value, and said second frame format has a synchronization field comprising a second predetermined number of consecutive bits of a second polarity or logic value, opposite to said first polarity or logic value.

4. The apparatus according to claim 1, wherein said synchronization field is scrambled prior to transmission thereof, and the frame format decoder comprises a descrambler to which said data frame is applied, the output of said descrambler being applied to said counter.

5. The apparatus according to claim 1, wherein said data frame is spread by means of a direct sequence spread spectrum or frequency hopping spread spectrum technique prior to transmission thereof, and said apparatus comprises a despreader to which said data frame is applied prior to the data being passed to said counter.

6. The apparatus according to claim 5, wherein the frame format decoder further comprises a demodulator for demodulating the output data from said despreader, prior to the data being provided to said counter.

7. The apparatus according to claim 6, wherein said demodulator comprises a Differential Binary Phase Shift Keying demodulator.

8. The apparatus according to claim 1, wherein data representative of said frame format type and said training sequence are output substantially simultaneously.

9. The apparatus according to claim 1, wherein the frame format decoder further comprises a descrambler and the training sequence generator comprises a scrambler, a modulator, and a data spreader, wherein data output from the descrambler is applied to the scrambler, the modulator and the data spreader prior to being output as said training sequence, wherein said data frame is applied to said descrambler.

10. A receiver including said apparatus according to claim 1.

11. The receiver according to claim 10, including the equalizer.

12. The receiver according to claim 11, wherein said equalizer is an adaptive equalizer.

13. The receiver according to claim 10, wherein the receiver is a wireless receiver.

14. A wireless local area network comprising at least one transmitter for transmitting frames of data, and at least one receiver according to claim 10 for receiving said frames of data.

15. A wireless local area network according to claim 14, wherein the transmitter is a wireless transmitter, and the receiver is a wireless receiver.

16. The apparatus according to claim 1, wherein N is equal to 7.

17. A method of determining a frame format of data received by a receiver, said frame format including a synchronization field which defines said frame format as being a first or second type, the method comprising the steps of:
   receiving a frame at the receiver;
   counting a number of consecutive bits of the synchronization field of said frame;
   determining, when N consecutive bits having the same polarity or logic value have been counted, if said frame format is of said first or second type, depending on the polarity or logic value of said N consecutive bits, where N is an integer greater than 1; and
   outputting data representative of said frame format type in the form of a training sequence for an equalizer.

18. The method according to claim 17 wherein data representative of said frame format type and said training sequence are output substantially simultaneously.

19. The method according to claim 17 wherein the receiver is a wireless receiver.

* * * * *